(12) United States Patent
Zsiga et al.

(10) Patent No.: US 12,110,803 B2
(45) Date of Patent: Oct. 8, 2024

(54) AIRCRAFT TURBINE ENGINE ASSEMBLY COMPRISING A SUPPORT FOR EQUIPMENT

(71) Applicant: SAFRAN AIRCRAFT ENGINES, Paris (FR)

(72) Inventors: Zoltan Zsiga, Moissy-Cramayel (FR); Valentin Sébastien Simon Avoyne, Moissy-Cramayel (FR); Matthieu Bruno François Foglia, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/568,168

(22) PCT Filed: May 27, 2022

(86) PCT No.: PCT/FR2022/051006
§ 371 (c)(1),
(2) Date: Dec. 7, 2023

(87) PCT Pub. No.: WO2022/258903
PCT Pub. Date: Dec. 15, 2022

(65) Prior Publication Data
US 2024/0287917 A1 Aug. 29, 2024

(30) Foreign Application Priority Data
Jun. 9, 2021 (FR) ...................................... 2106094

(51) Int. Cl.
*F01D 25/28* (2006.01)
*F01D 25/24* (2006.01)
*F02C 7/32* (2006.01)

(52) U.S. Cl.
CPC ............. *F01D 25/28* (2013.01); *F01D 25/24* (2013.01); *F02C 7/32* (2013.01)

(58) Field of Classification Search
CPC ............. F01D 25/28; F01D 25/24; F02C 7/32
(Continued)

(56) References Cited

U.S. PATENT DOCUMENTS

| 10,287,984 B2 * | 5/2019 | Fert | F02C 3/04 |
| 10,309,309 B2 * | 6/2019 | Thies | B64D 13/02 |
| 2006/0248900 A1 * | 11/2006 | Suciu | F02C 7/36 |
| | | | 60/802 |

FOREIGN PATENT DOCUMENTS

| DE | 102011112254 A1 * | 3/2013 | ........... F01D 25/125 |
| EP | 2565422 A2 | 3/2013 | |

(Continued)

OTHER PUBLICATIONS

Translation DE-102011112254-A1 (Year: 2024).*
(Continued)

*Primary Examiner* — J. Todd Newton
(74) *Attorney, Agent, or Firm* — Bookoff McAndrews, PLLC (57) ABSTRACT

An assembly for an aircraft turbomachine, comprising an intermediate casing hub, an equipment support having an upstream face located downstream of the intermediate casing hub, and a transfer gear box driving a power transmission shaft configured to transmit mechanical power, taken off an engine shaft of the turbomachine, to at least one upstream equipment item mounted on the upstream face of the equipment support, the upstream equipment item comprising a structural element attaching the equipment support to the intermediate casing hub.

12 Claims, 7 Drawing Sheets

(58) Field of Classification Search
USPC .................................................. 415/122.1
See application file for complete search history.

(56) References Cited

FOREIGN PATENT DOCUMENTS

| | | |
|---|---|---|
| FR | 2952672 A1 | 5/2011 |
| WO | 2015067906 A1 | 5/2015 |

OTHER PUBLICATIONS

Search Report and Written Opinion issued in International Application No. PCT/FR2022/051006, mailed Dec. 15, 2022.
Search Report issued in French Application No. 2106094, mailed on Feb. 15, 2022.

* cited by examiner

AIRCRAFT TURBINE ENGINE ASSEMBLY COMPRISING A SUPPORT FOR EQUIPMENT

CROSS-REFERENCE TO RELATED APPLICATIONS

This is a National Stage Application under 35 U.S.C. § 371 of International Application No. PCT/FR2022/051006, filed May 27, 2022, now published as WO 2022/258903 A1, which claims priority to French Patent Application No. 2106094, filed on Jun. 9, 2021, the entireties of which are incorporated herein by reference.

TECHNICAL FIELD

The present disclosure relates to the general field of turbomachines, in particular aeronautical turbomachines. The present disclosure relates to the mounting of an equipment support in such a turbomachine, and more specifically an assembly for an aircraft turbomachine comprising an equipment support.

PRIOR ART

In a turbomachine, used for example for the propulsion of an aircraft such as an airplane or a helicopter, equipment and accessories such as pumps for the production of hydraulic power, the supply of fuel and lubrification, electric generators for the production of electric power etc., are grouped together on an equipment support commonly known as an Accessory Gear Box (AGB). Such a support generally bears one or more gear trains which are rotationally driven by taking-off power from a shaft of the turbomachine and to which the different accessories then couple.

For various reasons, the equipment support can be provided around a compressor of the turbomachine. Under these circumstances, it is then natural to at least partially attach the equipment support to the casing of the compressor. However, this can lead to a phenomenon of ovalization of the casing, which has an adverse effect on the performance of the compressor. To counter this problem, the patent application FR 2 952 672 of the Applicant makes provision for suspending the equipment support from the beam (also known as the pylon) located above the casing of the compressor and via which the turbojet engine is fastened to the wing of an airplane, in a configuration in which the suspension of the turbojet engine from this beam is done at the level of an intermediate casing of the engine. Although it provides satisfaction in certain cases, such a solution can be difficult to implement, particularly when the turbojet engine is fastened to the aircraft by another system, or else when the equipment support is located under the casing of the compressor and does not extend above this casing. Furthermore, this solution requires a number of connections which can be complex or bulky.

SUMMARY OF THE INVENTION

The present disclosure has the aim of at least partly remedying these drawbacks.

For this purpose, the present disclosure relates to an assembly for an aircraft turbomachine comprising an intermediate hub casing, an equipment support having an upstream face located downstream of the intermediate casing hub, and a transfer gear box driving a power transmission shaft configured to transmit mechanical power, taken off an engine shaft of the turbomachine, to at least one upstream equipment item mounted on the upstream face of the equipment support, the upstream equipment item comprising a structural element attaching the equipment support to the intermediate casing hub.

The term "axis of the turbomachine" refers to an axis of rotation of a rotor of the turbomachine, for example a compressor rotor. The axial direction corresponds to the direction of the axis of the turbomachine and a radial direction is a direction perpendicular to this axis and intersecting this axis. In the same way, an axial plane is a plane containing the axis of the turbomachine and a radial plane is a plane perpendicular to this axis. A circumference extends like a circle belonging to a radial plane and the center of which belongs to the axis of the turbomachine. A tangential or circumferential direction is a direction tangent to a circumference; it is perpendicular to the axis of the turbomachine but does not pass through the axis.

Unless otherwise specified, the adjectives "inner" and "outer" are used with reference to a direction radiale such that the inner part of an element is, along a radial direction, closer to the axis of the diffuser than the outer part of the same element.

Finally, unless otherwise specified, the terms "upstream" and "downstream" are used with reference to the overall direction of flow in a turbomachine, namely from the compressor to the turbine.

In a turbomachine, the intermediate casing is located upstream of the compressor casing, where applicable upstream of the high-pressure compressor casing (and optionally downstream of the low-pressure compressor casing) when the turbomachine comprises several compressors. When the turbomachine comprises a fan, the intermediate casing is located downstream of the retaining casing of the fan, which is disposed annularly around the fan.

The intermediate casing hub denotes a radially inward part of the intermediate casing. In a bypass turbomachine, the intermediate casing hub can refer to the part of the intermediate casing that separates the primary flow from the secondary flow. The role of the intermediate casing hub is to allow for continuity of structure, between the primary flow and the secondary flow, to convey the loads to the upstream suspensions of the turbomachine. In addition, the hub of the intermediate casing can be used to attach the yokes of the thrust take-up rods, the air discharge outlets of the low pressure compressor and different equipment items such as actuators, probes etc.

The Transfer Gear Box (TGB) rotationally drives the power transmission shaft, also known as the transfer shaft, configured to transmit to the equipment support the mechanical power drawn off an engine shaft, for example a high-pressure or low-pressure body of the turbomachine. The kinematic link between the power transmission shaft and the engine shaft can be done via a gearing and by way of a shaft, particularly a radial shaft. Thus, the mechanical power can be transmitted to at least one upstream equipment item mounted on the equipment support in order to rotationally drive a movable part of the equipment item, generally by way of gearings provided between the power transmission shaft and the upstream equipment item. The transfer box is disposed in the intermediate casing hub, and is connected to the equipment support by way of the power transmission shaft.

The assembly for an aircraft turbomachine according to the present disclosure judiciously uses one or more upstream equipment items while including a structural element to attach the equipment support to the intermediate casing hub, which makes it possible to dispense with an attachment of the equipment support both to a compressor casing and to a beam for fastening to an airplane wing. It will be understood that the upstream equipment item, comprising the structural element allowing the attachment of the equipment support to the intermediate casing hub, is an equipment item or accessory strictly speaking of the equipment support, such as a pump or an electric generator for example, rotationally driven by the transfer gear box, and is therefore separate from said transfer gear box.

A structural element is an element configured to provide a structural retainment and load take-up role. In this case, the structural element can allow the independent attachment of the equipment support to the intermediate casing hub, even if, as will be seen further on, other elements can be involved to take up the loads along certain degrees of freedom.

Thanks to the fact that the upstream equipment item comprises a structural element attaching the equipment support to the intermediate casing hub, the equipment support is adaptable to any type of aircraft turbomachine without requiring the addition of a beam, and the attachments of the equipment support are moreover simplified, which frees up design space for other aspects of the turbomachine.

In certain embodiments, the upstream equipment item comprises a functional part, the structural element at least partly surrounding the functional part.

The term "functional part" comprises the part of the equipment item used to fulfil the function in the strict sense, for which the equipment item has been provided. For a pump for example, the functional part can be the rotary part, used to carry out the pumping. The structural element can therefore be a jacket, or a casing at least partly surrounding the functional part while being configured to support the equipment support and attach it to the intermediate casing hub, and to take up the loads moving between the equipment support and the intermediate casing hub. It is thus possible to suspend and attach the equipment support to the intermediate casing hub by way of one (or more) existing equipment items, to which is added a structural element allowing the equipment item to fulfil these attachment and load take-up functions.

In certain embodiments, the at least one upstream equipment item is one from among an electric generator to supply electrical power to the aircraft, an alternator to supply electrical current to electrical equipment items of the turbomachine, a starter to start the turbomachine, a hydraulic pump to provide hydraulic power to the aircraft, a fuel pump, or a lubrication pump.

The upstream equipment item can be one of these accessories or, when the assembly comprises several equipment items each having a structural element, several of these accessories can be present, one or more of each accessory being present. Each of these equipment items comprises a functional part used to provide the electric power, electric current, hydraulic power, pneumatic power, fuel flow rate/pressure etc., according to the scenario, and a structural element allowing the attachment of the equipment support to the intermediate casing hub. Moreover, this list is non-limiting, since other equipment items can be envisioned, such as a de-oiler, a compressor, or non-rotary equipment items such as exchangers.

In certain embodiments, the structural element is rigidly attached to the upstream face and to the intermediate casing hub.

The equipment support is preferably formed by a box comprising the upstream face. The term "rigid attachment" should be understood to mean that the structural element is attached directly to the upstream face and to the intermediate casing hub, with no degree of freedom. For example, the attachment of the structural element to the intermediate casing hub can be done by bolting. The attachment of the structural element is therefore simple and robust.

In certain embodiments, the structural element is rigidly attached to the upstream face and to the intermediate casing hub by way of a deformable connection.

A deformable connection can be embodied by means of a bolting comprising a deformable intermediate part, inserted between the structural element and the intermediate casing hub, used in particular to absorb the vibrations.

In certain embodiments, the structural element is rigidly attached to the upstream face, the assembly further comprising at least one upstream arm connecting the structural element of the upstream equipment item to the intermediate casing hub, and wherein a rigid sheath surrounds the power transmission shaft and rigidly attaches the equipment support to the intermediate casing hub.

According to this configuration, the structural element is attached on the one hand rigidly to the upstream face, and on the other hand to the intermediate casing hub via an upstream arm. When the assembly comprises several equipment items, each having a structural element, each of the structural elements is connected to the intermediate casing hub by way of an arm. Moreover, the equipment support is also attached to the intermediate casing hub via the rigid sheath surrounding the transmission shaft, the rigid sheath then also being a structural element. The arms are used to mainly take up the moments along three orthogonal axes, these moments being able to become significant when the equipment support is dimensioned to bear at least three equipment items, while the rigid sheath can be configured to mainly take up the loads along said three axes.

Furthermore, the fact of connecting the upstream arm to the structural element, and not directly to the upstream face of the equipment support, makes it possible to limit the bulk of the assembly. Specifically, when the equipment support comprises several equipment items on its upstream face, and at least certain equipment items on the upstream face are very close to one another, there is little remaining space to attach an arm between these equipment items. The presence of structural elements, to which an upstream arm can be attached, thus makes it possible to limit the bulk of the assembly.

In certain embodiments, the structural element is rigidly attached to the upstream face, the assembly further comprising at least six upstream arms connecting the equipment support to the intermediate casing hub, at least one of the six upstream arms connecting the structural element of the upstream equipment item to the intermediate casing hub.

The presence of six upstream arms makes it possible to take up the six degrees of freedom of the equipment support, without requiring the presence of a rigid sheath surrounding the power transmission shaft and rigidly attaching the equipment support to the intermediate casing hub. Preferably, each upstream arm comprises a ball at each of its ends. Still preferably, each upstream arm is connected to a structural element. This configuration is made possible by the presence of the structural element(s), making it possible to attach the upstream arms to the structural elements and not to the upstream face of the equipment support, since this upstream can be encumbered by the presence of the equipment items. Alternatively, at least one (or more) of the six upstream arms can be connected to a structural element, the other upstream arms being connected to the upstream face, according to the bulk and space available.

In certain embodiments, the structural element is rigidly attached to the upstream face, the assembly further comprising at least one upstream arm connecting the structural element of the upstream equipment item to the intermediate casing hub, at least one downstream equipment item mounted on a downstream face of the equipment support, and at least one downstream arm configured to connect the downstream equipment item to a casing of the turbomachine disposed downstream of the equipment support.

According to this configuration, the structural element is also attached, on the one hand, rigidly to the upstream face, and on the other hand to the intermediate casing hub via an upstream arm. However, given the presence of the downstream arm(s), the attachment of the transfer gear box to the equipment support can be rigid (via the aforementioned rigid sheath) particularly to serve as centering at the level of the intermediate casing, or flexible, via a slider ball joint for example. Note that the downstream equipment items preferably include a structural element to which the downstream arm is connected. The latter is also connected to a casing of the turbomachine disposed downstream of the equipment support, preferably downstream of the combustion chamber, for example to the low-pressure turbine casing. It will also be understood that the downstream equipment items can be one of the equipment items listed previously with reference to the upstream equipment items, and are also rotationally driven by the transfer gear box.

In certain embodiments, the at least one upstream arm is attached to an intermediate casing and/or to the structural element of the upstream equipment item in an articulated manner.

More precisely, in certain embodiments, the at least one arm is attached to the intermediate casing hub and/or to the structural element in an articulated manner such as to take up the loads only along the axis of the arm (under tension and/or compression). An articulation may comprise two parts mechanically in motion with respect to one another, in which case the arm can be a rod or linkage, for example a pivoted rod, and/or comprise an elastically deformable part such as to allow a certain movement of the arm, which can then be a simple beam, with respect to the intermediate casing hub and/or to the structural element. Using these means, the attachment of the equipment support can be isostatic and does not require any adjustment during its assembly. The suspensions may also be equipped with flexible studs to absorb vibrational stresses.

In certain embodiments, the at least one downstream arm is attached to the casing of the turbomachine disposed downstream of the equipment support and/or to the structural element of the downstream equipment item in an articulated manner such as to take up the tensile loads only.

In certain embodiments, the attachment of the equipment support to the intermediate casing hub is isostatic. Consequently, the dimensioning of the assembly is simplified and the attachment does not require any adjustment during its assembly.

In certain embodiments, the equipment support is attached to the intermediate casing hub such that, in a working position, a majority of the equipment support is located below an axis of the intermediate casing hub.

The working position is a position in which the assembly for a turbomachine is integrated into a turbomachine itself assembled on an aircraft. In this position, at least 50% of the volume of the equipment support is located below the axis of the intermediate casing hub. Such situations are encountered when the equipment support is so-called "six o'clock (6 h) mounted", for example, with reference to an imaginary clock, the 12 h-6 h axis of which is aligned with the vertical, 12 h being at the top and 6 h at the bottom. The equipment support can also be mounted, for example, at 5 h, at 7 h, etc. The reference point can be a center of gravity of the equipment support, where applicable provided with its equipment items and accessories.

In certain embodiments, the assembly comprises at least two upstream equipment items, the at least two upstream equipment items each comprising a structural element and being each disposed at two opposite ends of the equipment support.

In other words, the upstream equipment items are disposed on either side of the power transmission shaft, at two opposite ends of the equipment support. This makes it possible to distribute the load take-up between the structural elements. The term "ends" should be understood to mean the ends of the equipment items along a transverse direction, perpendicular to the axis of the turbine. Moreover, unlike in the scenario consisting of a single upstream equipment item equipped with a structural element, requiring a reinforced and therefore heavier structure to take up the loads, the presence of two upstream equipment items comprising a structural element makes it possible to better distribute these loads, while limiting the mass of the assembly.

In certain embodiments, the structural element of a first upstream equipment item is rigidly attached to the upstream face and to the intermediate casing hub, and the structural element of a second upstream equipment item is rigidly attached to the upstream face and to the intermediate casing hub by way of an upstream arm.

In certain embodiments, the equipment support extends in a ring portion. The equipment support can therefore be provided as close as possible to the main axis, around the engine compartment, such as to keep the turbomachine compact. The ring portion can be a semicircle, centered or otherwise on the axis of the turbomachine.

In certain embodiments, the intermediate casing hub comprises a downstream annular flange to which the structural element is fixed, and the transfer gear box comprises a bellcrank disposed in the intermediate casing hub upstream of the downstream annular flange, said bellcrank connecting the power transmission shaft to the engine shaft of the turbomachine by way of a radial shaft of the turbomachine. The bellcrank can allow the mechanical transmission of mechanical power between the radial shaft and the power transmission shaft. The downstream annular flange can be the same as that mentioned previously.

In certain embodiments, the ring portion covers an angular sector of less than 180°.

The present disclosure also relates to an aircraft turbomachine comprising an assembly in accordance with any of the embodiments previously defined. The aircraft can be, in particular, an airplane or a helicopter. The turbomachine can be a turbojet engine, a turboprop engine, an Auxiliary Power Unit (APU), etc.

In certain embodiments, the aircraft turbomachine comprises, downstream of the intermediate casing, a compressor casing and a combustion chamber casing, and the assembly previously described has no attachment between the equipment support and the compressor casing, and has no attachment between the equipment support and the combustion chamber casing. The performance of the turbomachine is therefore maintained.

BRIEF DESCRIPTION OF THE DRAWINGS

Other features and advantages of the subject of the present disclosure will become apparent from the following description of embodiments, given by way of non-limiting example, with reference to the appended figures.

DETAILED DESCRIPTION

Figure 1:
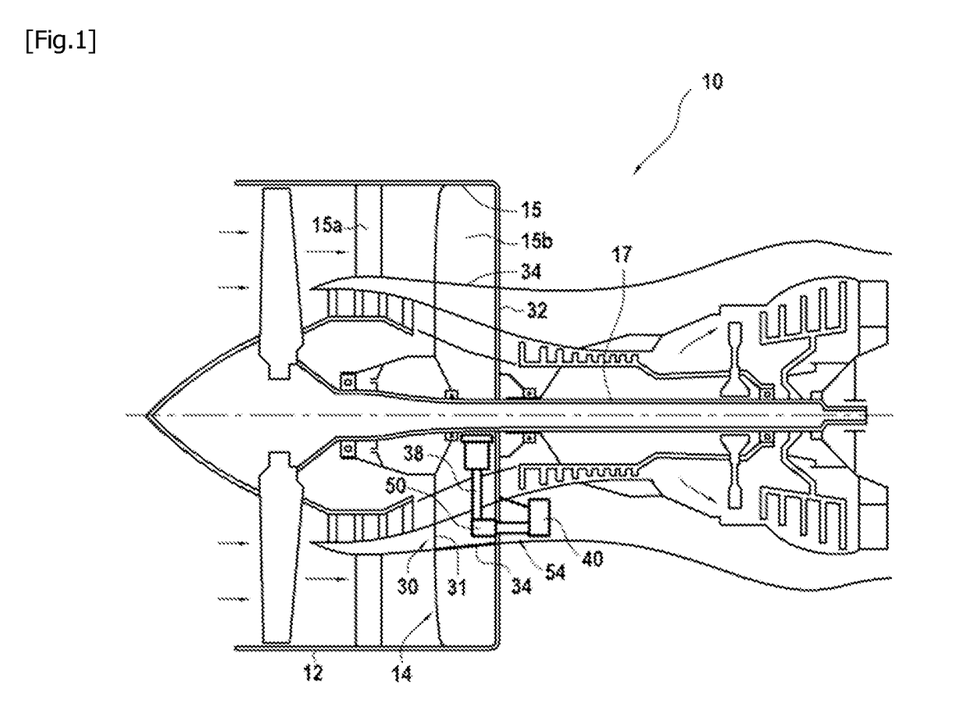
FIG. 1 is a schematic section of an aircraft turbomachine comprising an assembly according to a first embodiment.

FIG. 1 shows a section, in a simplified way, of a turbomachine 10 according to an embodiment. FIGS. 2 to 7 show a part of the turbomachine 10 in perspective, in bottom or side view. The turbomachine 10 is in this case a twin-spool bypass turbojet engine, but the present disclosure also covers other types of turbomachines, as mentioned previously. The turbomachine 10, or a turbomachine of another type, can be mounted under the wing of an aircraft, on the wing or else aft of the fuselage of the aircraft.

The turbomachine 10 generally extends along a main axis X forming an axis of rotation of at least a part of its rotors. The turbomachine 10 may comprise, from upstream to downstream, a fan-retaining casing 12, an intermediate casing 14, a compressor casing 60, a combustion chamber casing 16 and a turbine casing 18. Optionally, certain of these casings can be divided into several sections; for example, the turbine casing 18 may comprise a high-pressure turbine casing, an inter-turbine casing and a low-pressure turbine.

The different casings can be annular, or even axisymmetric, and centered on the axis X.

The intermediate casing 14 comprises an outer shroud 15 and an intermediate casing hub 30. The intermediate casing hub 30 can be connected to the outer shroud 15 by Outlet Guide Vanes (OGV) 15a to straighten the secondary flow coming from the fan, as well as by structural arms 15b.

The intermediate casing hub 30 can form a separation between a so-called primary flow path, configured to guide the primary flow passing through the core of the turbomachine and intended to participate in the combustion and driving of at least one turbomachine, and a so-called secondary flow path, configured to guide the secondary flow passing through the OGVs 15a to generate most of the thrust of the turbomachine 10.

In this case, the intermediate casing hub 30 comprises a downstream annular flange 32 extending radially inward from a downstream part of a frustoconical portion 34. The frustoconical portion 34 can be, at least in its downstream part, substantially concentric with the outer shroud 15, and, in the special case, axisymmetric around the main axis X.

The intermediate casing hub 30 may further comprise, here in the downstream flange 32, one or more openings 36 for the passage of discharge outlets of the compressor, particularly the low-pressure compressor. These outlets are commonly known as VBV (Variable Bleed Valve) outlets. In this case, the openings 36 are oval. The openings 36 can be disposed beside one another along a circumference.

The intermediate casing hub 30 can be made of metal, for example made of titanium, steel, aluminum, or a metallic alloy comprising one or more of these metals.

The intermediate casing hub 30 may also comprise an upstream flange 31. In this case, the upstream flange 31, annular, extends radially inward from an upstream part of the frustoconical portion 34. Between the upstream flange 31 and the downstream flange 32 are one or more hollow structures, extending for example in the prolongation of arms which traverse the primary flow path, and optionally in the prolongation of the structural arms 15b, as illustrated. These hollow structures allow the passage of ancillaries, such as lubrication circuits, means for measuring speed etc., but also of a radial shaft 38, the role of which will be described further on.

Within the turbomachine 10, an assembly for an aircraft turbomachine 20 comprises the aforementioned intermediate casing hub 30, but also an equipment support 40.

FIGS. 2 to 7 show that the equipment support 40 extends in a ring portion, here around the main axis X. In this embodiment, the ring portion covers an angular sector preferably of less than 180°, in this case less than 120°.

The equipment support 40 can be formed by a box which presents a upstream face 42, turned toward the intermediate casing hub 30, and a face opposite said downstream face 44, turned toward the downstream of the turbomachine, for example toward the turbine casing 18. The upstream face 42 and/or the downstream face 44 can be substantially flat, and/or extend transversally to the main axis X, as illustrated.

It can immediately be seen that the upstream face 42 is downstream of the intermediate casing hub 30, owing to the dispositions detailed below.

Moreover, the assembly for an aircraft turbomachine 20 comprises a transfer gear box 50 rigidly attached to the intermediate casing hub 30, preferably upstream of the downstream flange 32, for example via a bolted joint. Alternatively, the transfer gear box 50 can be formed as a single part with the intermediate casing hub 30, by being incorporated into it when it is foundry-cast. A power transmission shaft 54 connects the transfer gearbox 50 to the equipment support 40, and is configured to transmit mechanical power, taken off an engine shaft 17 of the turbomachine, to at least one equipment item mounted on the equipment support, where applicable via one or more gear trains.

The power transmission shaft 54 can take off mechanical power from the engine shaft 17 via an intermediate shaft known as the radial shaft 38, due to its positioning generally along a radial direction of the turbomachine 10. Where applicable, the transfer gear box 50 may comprise a bellcrank forming a kinematic link between the radial shaft 38 and the power transmission shaft 54. For example, the bellcrank may comprise a transmission formed by a bevel pinion coupling. As illustrated in FIG. 1, the bellcrank can be located between the upstream flange 31 and the downstream flange 32 of the intermediate casing hub 30, or else disposed on the downstream flange 32.

A linking element 52 extending between the transfer gear box 50 and the equipment support 40 is disposed around the transmission shaft 54 and protects the latter. According to a first embodiment in accordance with the invention, the connecting element 52 is a non-structural flexible connection allowing the connection of the transfer gear box 50 to the equipment support 40, and for example comprising a ball joint with a slider (not shown).

Moreover, as indicated previously, the equipment support 40 can enclose the gear trains mentioned previously (not shown) which are rotationally driven by a power take-off from an engine shaft 17 (for example the high-pressure body shaft) of the turbomachine 10. One or more equipment items may be mounted on the equipment support 40 and can each have a drive shaft which is coupled to one of the gearings of the equipment support 40. These drive shafts, not shown in the figures, may extend along a direction substantially parallel to the main axis X. From among these equipment items, it is possible to make provision for one or more elements from among the following, including one or more of each: an electric generator to supply electrical power to the aircraft, an alternator to supply electrical current to electrical equipment items of the turbomachine, a starter to start the turbomachine, a hydraulic pump to supply hydraulic power to the aircraft, a fuel pump, and a lubrication pump. Of course, other equipment items than those mentioned above, for example a de-oiler, can be mounted on the equipment support 40, in particular equipment items requiring a mechanical drive and therefore a power take-off on the equipment support to operate.

Figure 2:
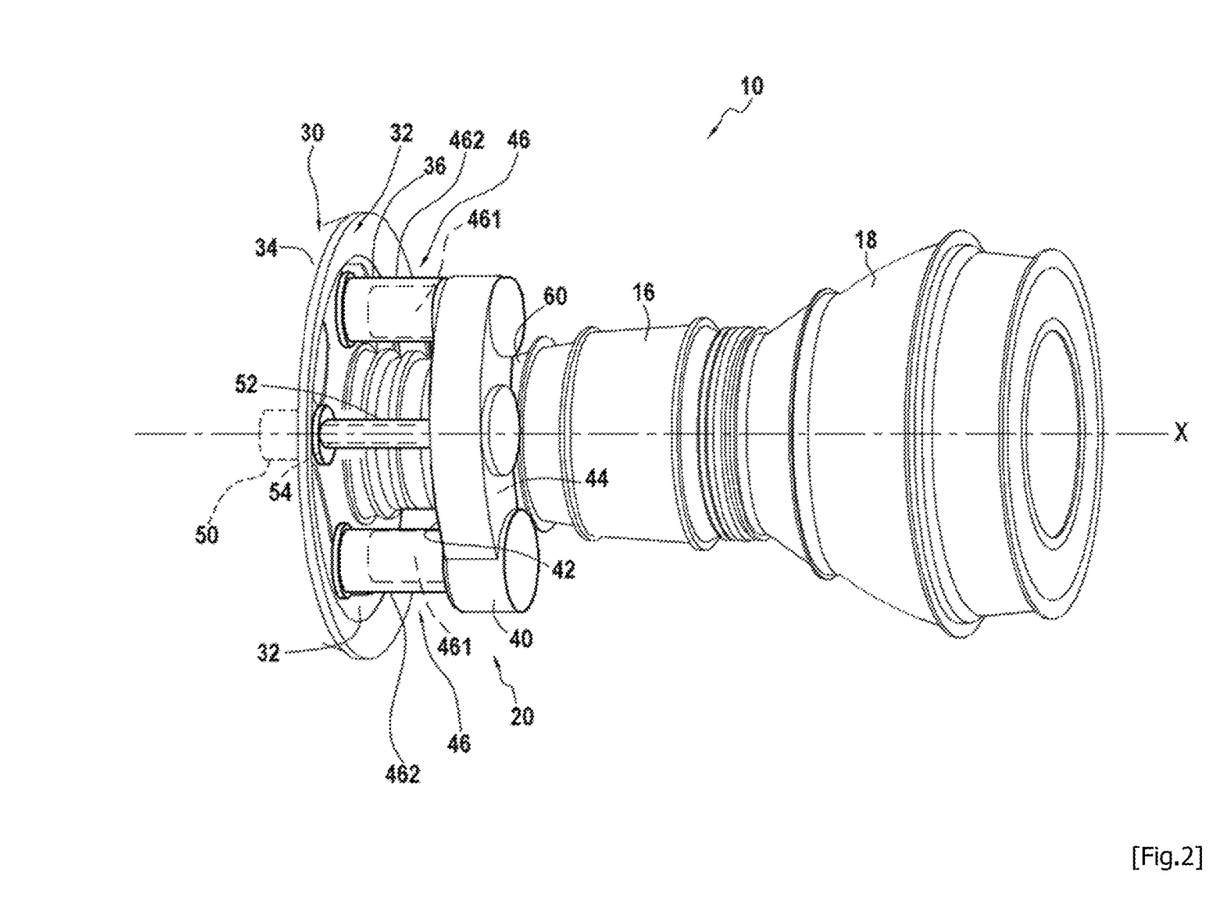
FIG. 2 is a bottom view, in perspective, of a part of the aircraft turbomachine according to the first embodiment.
Figure 3:
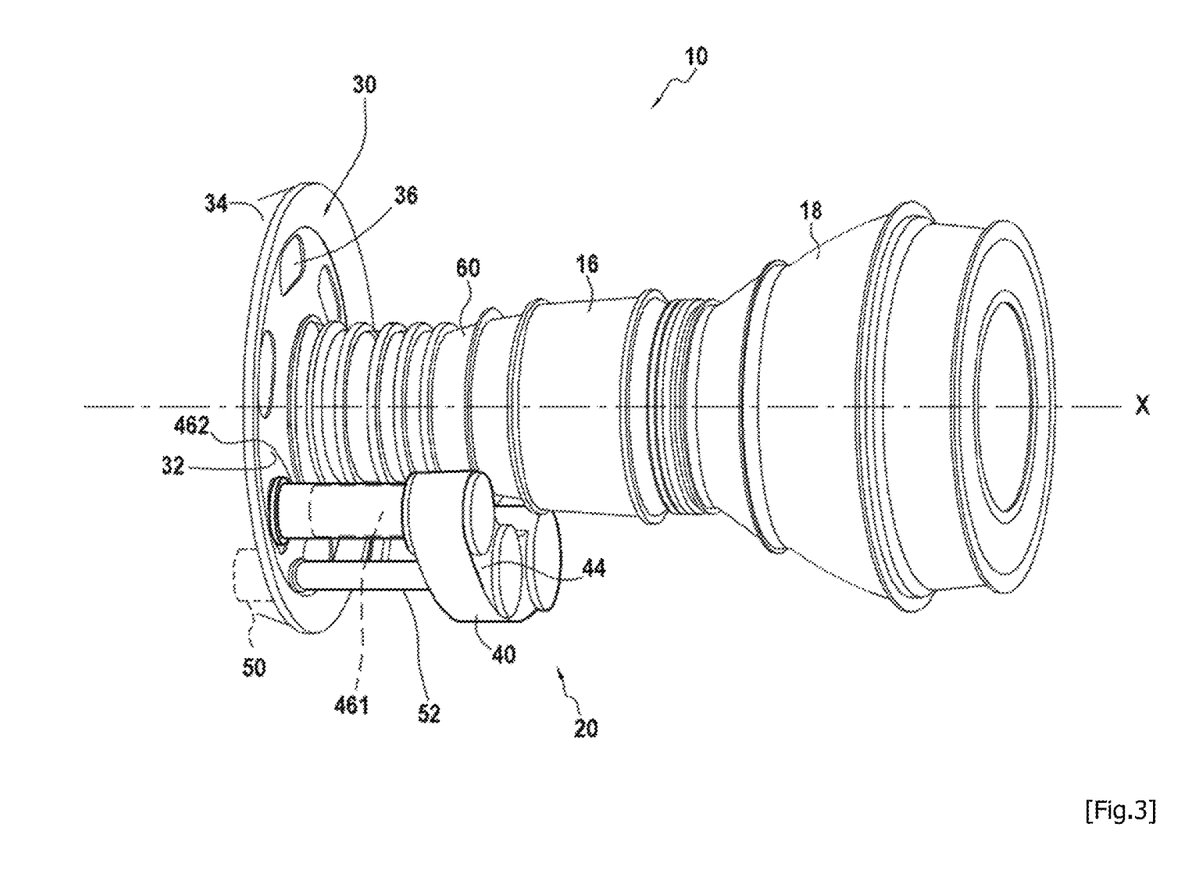
FIG. 3 is a side view, in the working position, of the part of the turbomachine of FIG. 2.

In the example illustrated in FIGS. 2 and 3 with reference to the first embodiment, two upstream equipment items 46 are shown, mounted on the upstream face 42 of the equipment support 40. However, other equipment items could be mounted on the upstream face 42, and also on the downstream face 44.

These upstream equipment items 46 are respectively disposed at the ends of the equipment support 40, and each comprise a functional part 461 and a structural element 462. In this case, the structural element 462 also forms the casing of the equipment item 46, surrounding the functional part 461 of the equipment item 46, as shown in FIGS. 2 and 3. The shape of the conventional casing can be modified in such a way that it can be attached more easily both to the upstream face 42 of the equipment support 40 and to the intermediate casing hub 30. Note that a structural element 462 intended to be attached to the intermediate casing hub 30 is preferably added to the equipment items 46 having the functional parts 461 with the greatest axial lengths. The distance between the upstream face 42 and the intermediate casing hub 30 is thus determined in particular by the axial length of these functional parts 461, it being moreover understood that there can be a minimum distance to be observed so that the upstream face 42 does not interfere with elements attached to the intermediate casing hub, such as for example discharge outlet ducts of the compressor.

Thus, in this embodiment, the structural elements 462 are reinforced in such a way as to be capable of bearing the total load of the equipment support 40 and of the elements it includes, and to keep the equipment support 40 rigidly attached to the intermediate casing hub 30.

The structural elements 462 are mainly formed by a wall which can be cylindrical, with a section that is circular, elliptical, ellipsoidal, square, rectangular, polygonal or otherwise. If necessary, the structural elements 462 may comprise longitudinal and/or circumferential reinforcements to give it the desired stiffness. The reinforcements can be provided on the inside, or preferably, on the outside of the wall of the structural elements 462. The latter can be metallic, for example made of steel, titanium, aluminum or alloys comprising at least one of these metals, or else made of metallic matrix composite or organic matrix composite. They can also include channels ("core passages") or interface plates to ensure the circulation of the fluids (oil, fuel, Skydrol®) or air in the area of the equipment support 40.

As mentioned previously, the structural elements 462 are preferably disposed at the ends of the equipment support 40 and on either side of the transfer gear box 50, corresponding to the position of the equipment items 46, in such a way as to distribute the load take-up between the two structural elements 462 and balance the weight and loads of the equipment support 40.

The structural elements 462 can be mounted on the upstream face 42 of the equipment support 40 and on the intermediate casing hub 30 by bolting, for example via a bolted flange, a collar of V-band type or any other attaching method that can be envisioned by those skilled in the art, preferably removable, which is sufficiently robust to allow the rigid attachment of the equipment support 40 to the intermediate casing hub 30.

Owing to these dispositions, the equipment support 40, although attached to the intermediate casing hub 30, can be positioned downstream of the intermediate casing hub 30. Thus, in this embodiment, the equipment support 40 can be positioned axially at the level of the compressor casing 60, more specifically at the level of the high-pressure compressor casing, without however being attached to this compressor casing 60. Thus, distortion phenomena are avoided.

Figure 4:
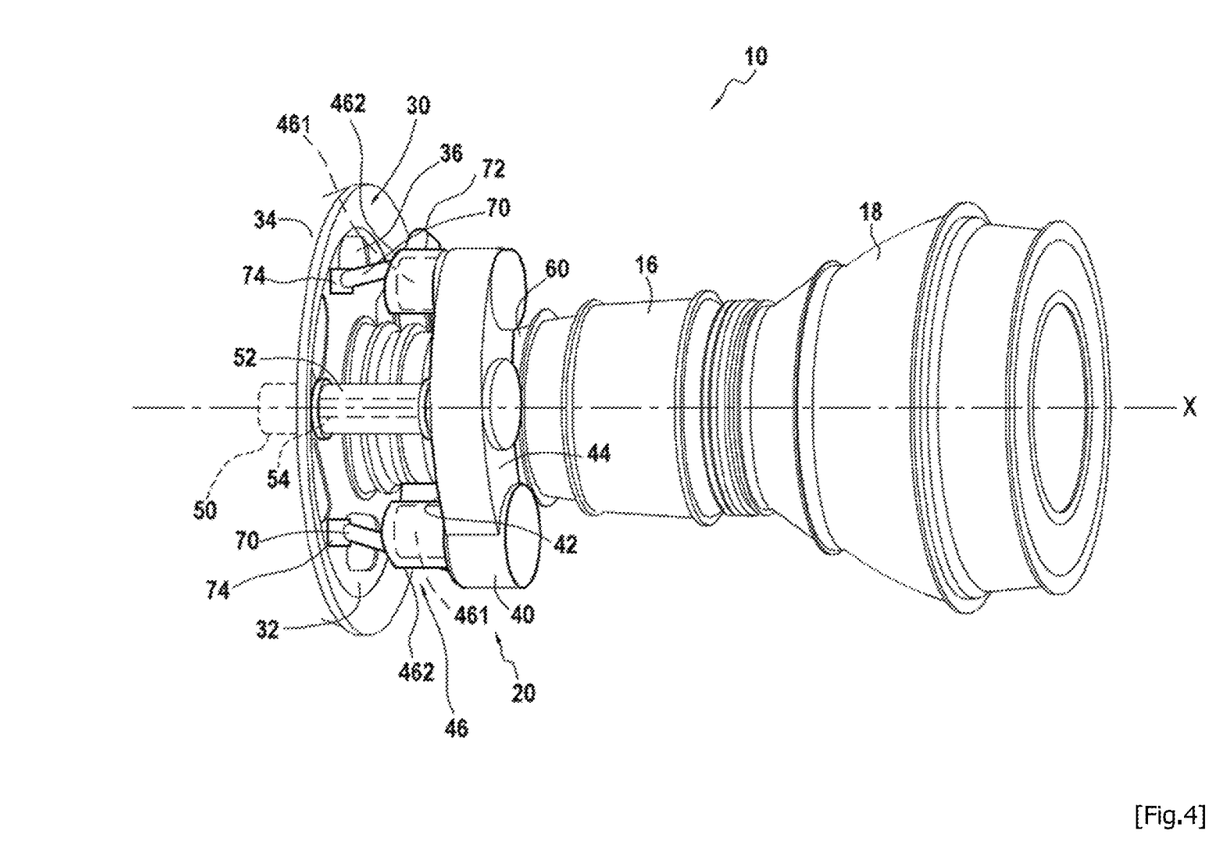
FIG. 4 is a bottom view, in perspective, of a part of the aircraft turbomachine according to a second embodiment.
Figure 5:
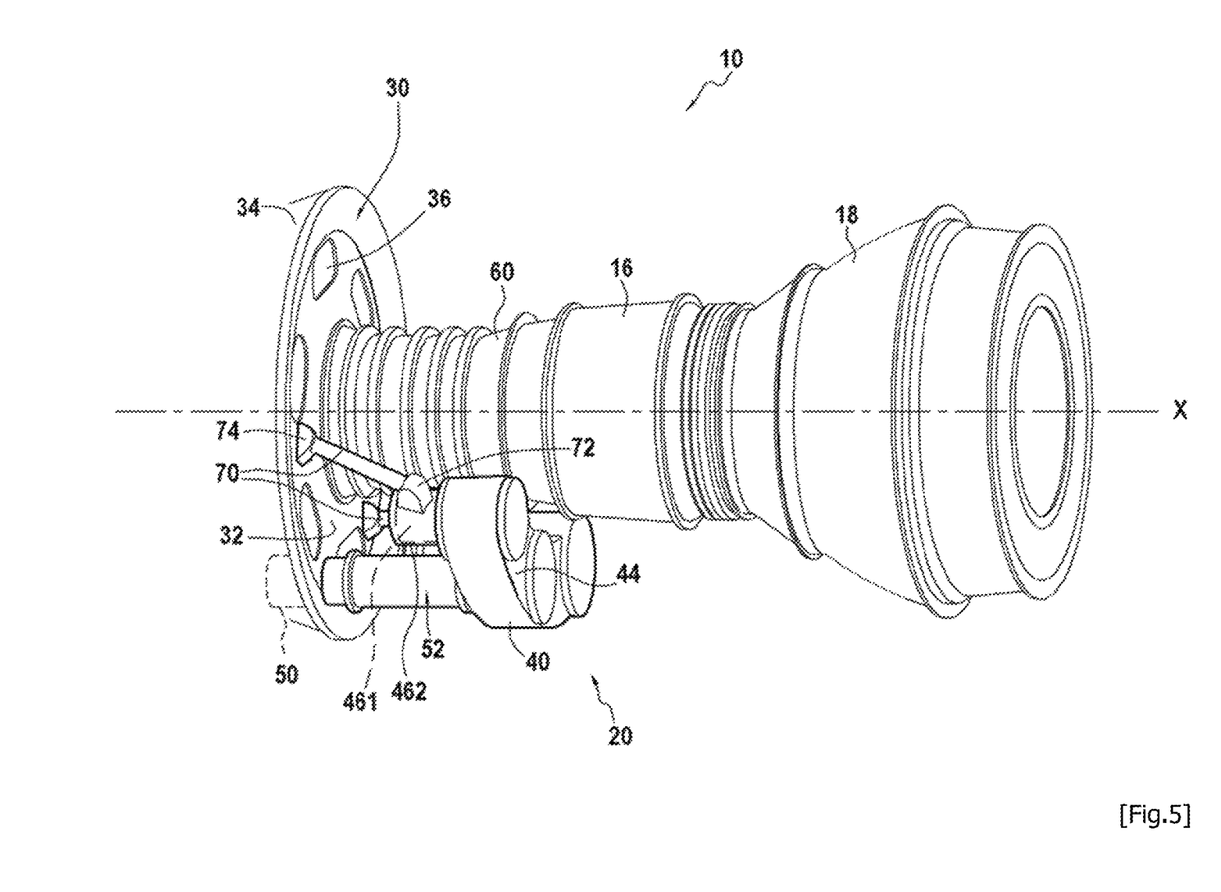
FIG. 5 is a side view, in the working position, of the part of the turbomachine of FIG. 4.

According to a second embodiment in accordance with the invention and shown in FIGS. 4 and 5, the assembly for an aircraft turbomachine 20 may comprise at least one upstream arm 70, or at least two upstream arms 70, in this case exactly two upstream arms 70, i.e. one arm for each upstream equipment item 46. Unless otherwise specified, below is a description of one of the upstream arms 70, the other being able to be identical or to have other features, particularly among those mentioned.

The upstream arm 70 connects the equipment item 46, more precisely the structural element 462, to the intermediate casing hub 30, to provide load take-up, for example of the axial loads, for example under tension. In this scenario, the structural element 462 is shorter, in the axial direction X, than the structural element described with reference to FIGS. 2 and 3 for the first embodiment. Thus, the structural element 462 extends upward in the direction of the intermediate casing hub 30 but is not directly attached thereto. The structural element 462 is attached to the intermediate casing hub 30 by way of the upstream arm 70.

More precisely, the upstream arm 70 is attached to the structural element 462 by a first connection 72 and to the intermediate casing 30 by a second connection 74. One and/or the other of the first connection 72 and of the second connection 74 can be articulated, such that the loads are taken up only along the axis of the arm (in tension and/or in compression).

For example, the first connection 72 can be a ball joint.

For example, the second connection 74 may comprise a flexible stud, for example comprising a series of metallic layers and elastomer layers.

These connections can be switched, or made identical to one another, or else other connections can be used, for example bolted joints, in particular combined with means for adjusting the arms to compensate for the hyperstatic nature of the connection.

As illustrated in FIGS. 4 and 5, the connection 72 can be provided on a peripheral surface of the structural element 462, or more generally on a surface separate from the upstream face of the structural element 462, but can also be provided on the upstream face of the structural element 462.

Between connections, the upstream arm 70 can be a bar or a rod, typically metallic or made of composite. The section of such a bar or rod can be dimensioned by those skilled in the art, for example with an H-shaped section or a hollow section, particularly of circular, ellipsoidal, square, rectangular or polygonal shape.

Moreover, according to this second embodiment, the connecting element 52 of the transfer gear box 50 is not a flexible connection, unlike the first embodiment, but is a structural connection, in other words a rigid connection rigidly attaching the equipment support 40 to the intermediate casing hub 30. In this case, the connection element 52 is formed by a sheath (hereinafter also referred to as "sheath 52"), said sheath 52 surrounding the power transmission shaft 54.

Thus, in this embodiment, the sheath 52 of the transfer gear box 50 is also reinforced in such a way as to be capable of bearing the loads of the equipment support 40, and of retaining the equipment support 40 rigidly attached to the intermediate casing hub 30.

The sheath 52 can have features (related to its shape and material) similar to the structural element 462 described with reference to the first embodiment. The sheath 52 can be attached to a circumferentially central part of the equipment support 40, and can be coupled to the equipment support 40 and to the intermediate casing hub 30 by bolting.

As illustrated, the assembly for an aircraft turbomachine 20 according to this embodiment has no other attachment between the equipment support 40 and the intermediate casing hub 30 than the sheath 52 and the two upstream arms 70 previously described. Owing to such an assembly, the attachment of the equipment support 40 to the intermediate casing hub 30 is isostatic. Other isostatic set-ups can however be envisioned. It is in particular possible to envision, for the connection element 52, a flexible non-structural connection in a similar way to the first embodiment, and not a structural connection, by increasing the number of upstream arms 70 to block the six degrees of freedom of the equipment support 40. Moreover, the arrangement illustrated in FIGS. 4 and 5 is not limiting. At least a first upstream arm 70 could connect a structural element 462 to the intermediate casing hub 30, and at least a second upstream arm 70 could be directly connected to the upstream face 42 of the equipment support 40, according to the bulk and the arrangement of the equipment items on the upstream face 42.

Moreover, as can be seen from FIGS. 4 and 5, the connections 74 can be provided between successive openings 36, such that the upstream arms 70 do not obstruct the discharge outlets of the compressor.

Figure 6:
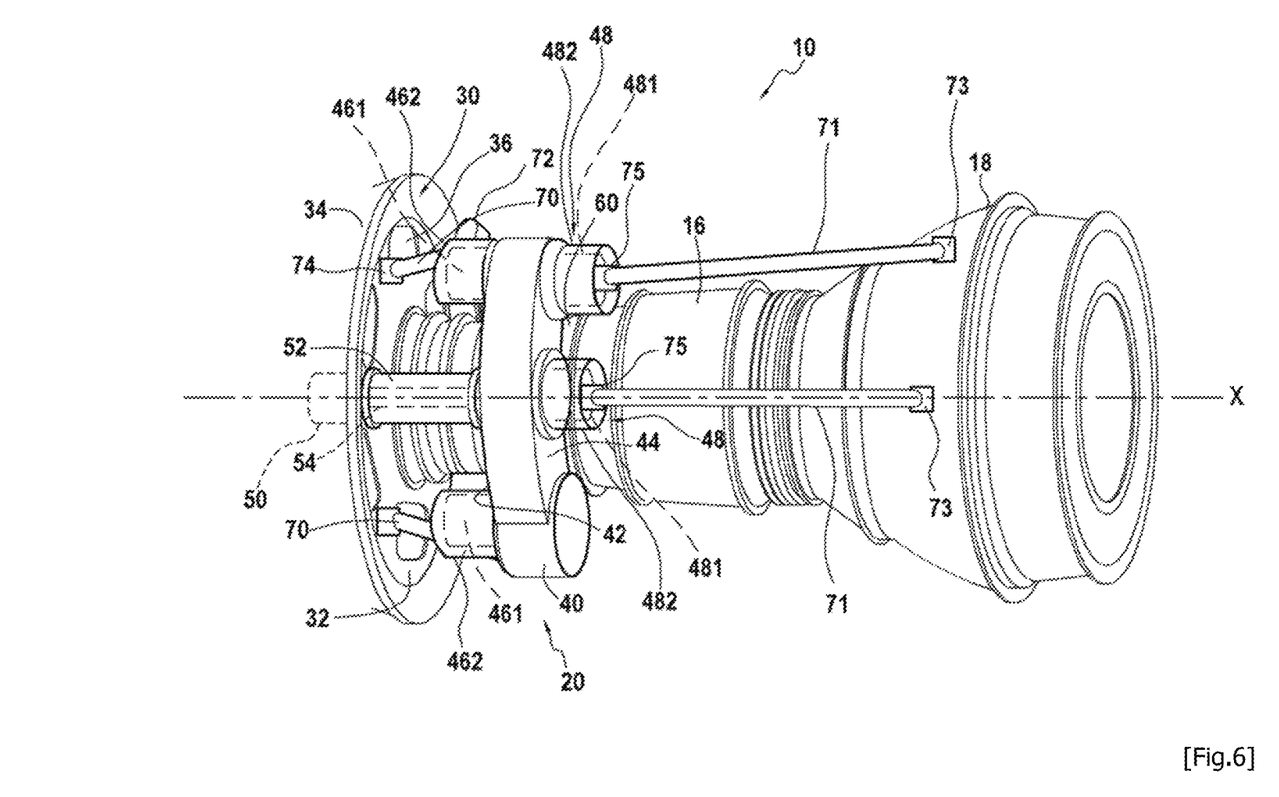
FIG. 6 is a bottom view, in perspective, of a part of the aircraft turbomachine according to a third embodiment.
Figure 7:
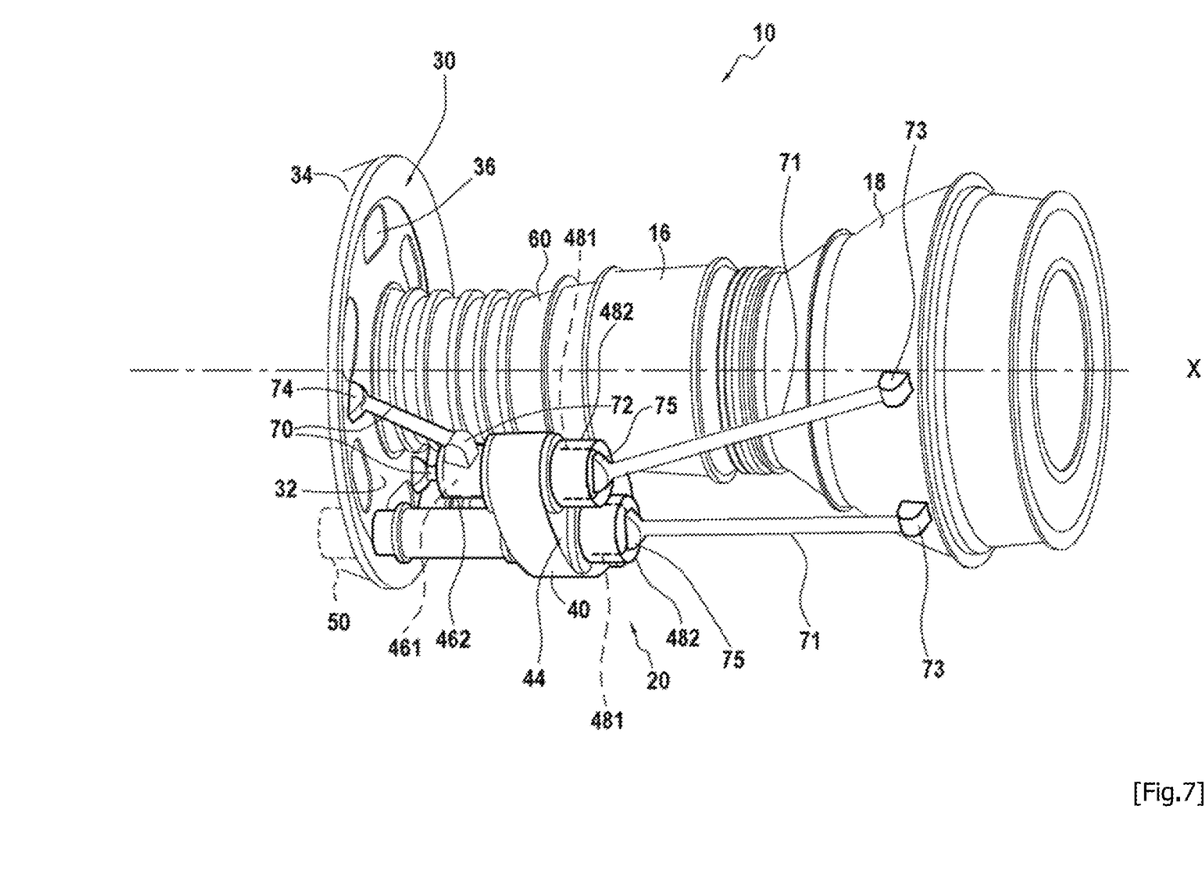
FIG. 7 is a side view, in the working position, of the part of the turbomachine of FIG. 6.

A third embodiment in accordance with the invention is shown in FIGS. 6 and 7. This embodiment is similar to the second embodiment on the upstream side of the equipment support 40, in that the assembly for an aircraft turbomachine 20 also comprises two upstream arms 70 arranged in the same way as in the second embodiment.

In the third embodiment, the assembly for an aircraft turbomachine 20 further comprises two downstream equipment items 48, disposed on the downstream face 44 of the equipment support 40. Similarly to the upstream equipment items 46, each downstream equipment item comprises a functional part 481 and a structural element 482. A first downstream equipment item 48 is disposed at one end of the equipment support 40, and a second downstream equipment item 48 is disposed on a central portion of the equipment support 40, along the circumferential direction. These positions are however not limiting, since downstream equipment items 48 can be disposed differently on the downstream face 44.

Furthermore, the assembly comprises two downstream arms 71 each connecting the downstream equipment item 48, more precisely the structural element 482, to a casing disposed downstream of the casing of the combustion chamber 16, in this case the turbine casing 18. Similarly to the upstream arms 70, the downstream arms 71 make it possible to ensure a load take-up, for example axial loads, for example under tensile loads.

Moreover, similarly to the upstream arms 70, each downstream arm 71 is attached to the structural element 482 by a first connection 75 and to the turbine casing 18 by a second connection 73. One and/or the other of the first connection 75 and of the second connection 7 can be articulated, such that the loads are taken up solely along the axis of the arms (under tension and/or compression), and can be a ball joint or comprise a flexible stud, for example comprising a succession of metallic layers and prestressed elastomer layers.

In addition, according to the third embodiment, the connection element 52 of the transfer gear box 50 can be a rigid sheath similar to the sheath described in the second embodiment and shown in FIGS. 6 and 7, but can also be a flexible connection such as that described with reference to the first embodiment for example. This second configuration is made possible by the presence of the downstream arms 71.

In general, FIGS. 3, 5 and 7 which show the turbomachine 10 in the working position, illustrate that the equipment support 40 is attached to the intermediate casing hub 30 such as to be found mainly below the main axis X of the intermediate casing hub 30. In this case, the equipment support 40 is six o'clock mounted, from which it is suspended from the intermediate casing hub 30. This position, which facilitates retainment under the wing and collection of fluids during operation and at engine shutdown, and minimizes the risk of fire since any leaks are evacuated under gravity, where applicable via the nacelle, makes all the more advantageous the fact of not attaching the equipment support 40 to the compressor casing 60.

Although this description refers to specific exemplary embodiments, modifications can be made to these examples without departing from the general scope of the invention as defined by the claims. Furthermore, individual features of the different embodiments illustrated or mentioned can be combined into additional embodiments. For example, in a configuration combining the first and second embodiment, in which two upstream equipment items are each equipped with a structural element 462, one of the two structural elements 462 could be rigidly attached by bolting to the intermediate casing hub 30, the second structural element 462 being connected to the intermediate casing hub by way of an upstream arm 70. Consequently, the description and drawings must be considered in an illustrative sense rather than a restrictive one.

The invention claimed is:

1. An assembly for an aircraft turbomachine, comprising an intermediate casing hub, an equipment support having an upstream face located downstream of the intermediate casing hub, and a transfer gear box driving a power transmission shaft configured to transmit mechanical power, taken off an engine shaft of the turbomachine, to at least one upstream equipment item mounted on the upstream face of the equipment support, the upstream equipment item comprising a structural element attaching the equipment support to the intermediate casing hub.

2. The assembly for an aircraft turbomachine as claimed in claim 1, wherein the upstream equipment item comprises a functional part, the structural element at least partly surrounding the functional part.

3. The assembly for an aircraft turbomachine as claimed in claim 1, wherein the at least one upstream equipment item is one from among an electric generator to supply electrical power to the aircraft, an alternator to supply electrical current to electrical equipment items of the turbomachine, a starter to start the turbomachine, a hydraulic pump to provide hydraulic power to the aircraft, a fuel pump, or a lubrication pump.

4. The assembly for an aircraft turbomachine as claimed in claim 1, wherein the structural element is rigidly attached to the upstream face and to the intermediate casing hub.

5. The assembly for an aircraft turbomachine as claimed in claim 1, wherein the structural element is rigidly attached to the upstream face, the assembly further comprising at least one upstream arm connecting the structural element of the upstream equipment item to the intermediate casing hub, and wherein a rigid sheath surrounds the power transmission shaft and rigidly attaches the equipment support to the intermediate casing hub.

6. The assembly for an aircraft turbomachine as claimed in claim 1, wherein the structural element is rigidly attached to the upstream face, the assembly further comprising at least one upstream arm connecting the structural element of the upstream equipment item to the intermediate casing hub, at least one downstream equipment item mounted on a downstream face of the equipment support, and at least one downstream arm configured to connect the downstream equipment item to a casing of the turbomachine disposed downstream of the equipment support.

7. The assembly for an aircraft turbomachine as claimed in claim 5, wherein the at least one upstream arm is attached to the intermediate casing hub and/or to the structural element of the upstream equipment item in an articulated manner.

8. The assembly for an aircraft turbomachine as claimed in claim 1, wherein the attachment of the equipment support to the intermediate casing hub is isostatic.

9. The assembly for an aircraft turbomachine as claimed in claim 1, wherein the equipment support is attached to the intermediate casing hub such that, in a working position, a majority of the equipment support is located below an axis of the intermediate casing hub.

10. The assembly for an aircraft turbomachine as claimed in claim 1, comprising at least two upstream equipment items, the at least two upstream equipment items each comprising a structural element and being each disposed at two opposite ends of the equipment support.

11. An aircraft turbomachine comprising an assembly as claimed in claim 1.

12. An aircraft turbomachine as claimed in claim 11, comprising, downstream of the intermediate casing, a compressor casing and a combustion chamber casing, and wherein the assembly has no attachment between the equipment support and the compressor casing as well as the combustion chamber casing.

* * * * *